(12) United States Patent
Kitagawa

(10) Patent No.: US 9,727,349 B2
(45) Date of Patent: Aug. 8, 2017

(54) DISPLAY CONTROL APPARATUS, DISPLAY CONTROL METHOD, AND STORAGE MEDIUM

(71) Applicant: CANON KABUSHIKI KAISHA, Tokyo (JP)

(72) Inventor: Kan Kitagawa, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 466 days.

(21) Appl. No.: 14/265,194

(22) Filed: Apr. 29, 2014

(65) Prior Publication Data

US 2014/0331132 A1 Nov. 6, 2014

(30) Foreign Application Priority Data

May 1, 2013 (JP) .................................. 2013-096554

(51) Int. Cl.
*G06F 3/048* (2013.01)
*G06F 9/44* (2006.01)
*G06F 3/0484* (2013.01)
*G06F 3/041* (2006.01)
*G06F 3/0488* (2013.01)

(52) U.S. Cl.
CPC .......... *G06F 9/4446* (2013.01); *G06F 3/0418* (2013.01); *G06F 3/0484* (2013.01); *G06F 3/04886* (2013.01); *G06F 9/4443* (2013.01)

(58) Field of Classification Search
CPC ... G06F 3/0488; G06F 3/04817; G06F 3/0481
See application file for complete search history.

(56) References Cited

U.S. PATENT DOCUMENTS

| | | | | |
|---|---|---|---|---|
| 5,946,647 | A * | 8/1999 | Miller | ................ G06F 17/2715 704/1 |
| 6,542,163 | B2 * | 4/2003 | Gorbet | ................ G06F 9/4446 715/708 |
| 9,250,766 | B2 * | 2/2016 | Gil | ................ G06F 3/04812 |
| 2006/0259861 | A1 * | 11/2006 | Watson | ................ G06F 9/4446 715/705 |
| 2007/0174230 | A1 * | 7/2007 | Martin | ................ G06F 3/04812 |
| 2007/0245241 | A1 * | 10/2007 | Bertram | ................ G06F 3/0481 715/711 |

(Continued)

FOREIGN PATENT DOCUMENTS

| | | |
|---|---|---|
| JP | 2007-066077 A | 3/2007 |
| JP | 2007-122286 A | 5/2007 |
| JP | 2013-077312 A | 4/2013 |

*Primary Examiner* — Ryan Pitaro
(74) *Attorney, Agent, or Firm* — Canon USA, Inc., IP Division

(57) ABSTRACT

An apparatus includes: a receiving unit configured to receive an input operation from a user performed on an accepting unit displayed on a display unit; a determination unit configured to determine whether or not detailed information set in the accepting unit is displayed on the display unit in accordance with the input operation received by the receiving unit, and at least one of a display state of the accepting unit and an input area of the input operation in the accepting unit; and a display control unit configured to control a display of the accepting unit displayed on the display unit in accordance with a determination result provided by the determination unit.

28 Claims, 11 Drawing Sheets

(56) References Cited

U.S. PATENT DOCUMENTS

| | | | |
|---|---|---|---|
| 2007/0300160 A1* | 12/2007 | Ferrel | G06F 17/30867 715/744 |
| 2008/0034329 A1* | 2/2008 | Posner | G06F 9/4446 715/856 |
| 2008/0168351 A1* | 7/2008 | White | G06F 9/4446 715/708 |
| 2008/0250317 A1* | 10/2008 | Evans | G06F 3/0481 715/712 |
| 2010/0076984 A1* | 3/2010 | Papadopoullos | G06F 17/3064 707/749 |
| 2010/0088632 A1* | 4/2010 | Knowles | G06F 3/04886 715/784 |
| 2010/0105443 A1* | 4/2010 | Vaisanen | G06F 3/0486 455/566 |
| 2011/0052090 A1* | 3/2011 | Nonaka | H04N 19/119 382/251 |
| 2011/0286038 A1* | 11/2011 | Yuasa | H04N 1/00408 358/1.15 |
| 2011/0302491 A1* | 12/2011 | Griffin | G06F 3/0488 715/702 |
| 2014/0006944 A1* | 1/2014 | Selig | G06F 9/4446 715/705 |
| 2014/0007019 A1* | 1/2014 | Saukko | G06F 3/0484 715/863 |
| 2014/0067551 A1* | 3/2014 | Schaub | G06Q 30/0273 705/14.69 |
| 2014/0173510 A1* | 6/2014 | Kanno | G06F 3/0481 715/808 |
| 2014/0282269 A1* | 9/2014 | Strutt | G06F 3/04886 715/863 |
| 2014/0380158 A1* | 12/2014 | Kapahi | G06F 3/0488 715/711 |
| 2014/0380245 A1* | 12/2014 | Kapahi | G06F 3/0488 715/845 |
| 2015/0205515 A1* | 7/2015 | Eldawy | G06F 3/0488 715/760 |
| 2015/0363100 A1* | 12/2015 | Miyashita | G06F 3/048 715/800 |
| 2015/0370620 A1* | 12/2015 | Lai | G06F 9/445 715/765 |
| 2016/0048298 A1* | 2/2016 | Choi | G06F 3/04842 715/846 |

* cited by examiner

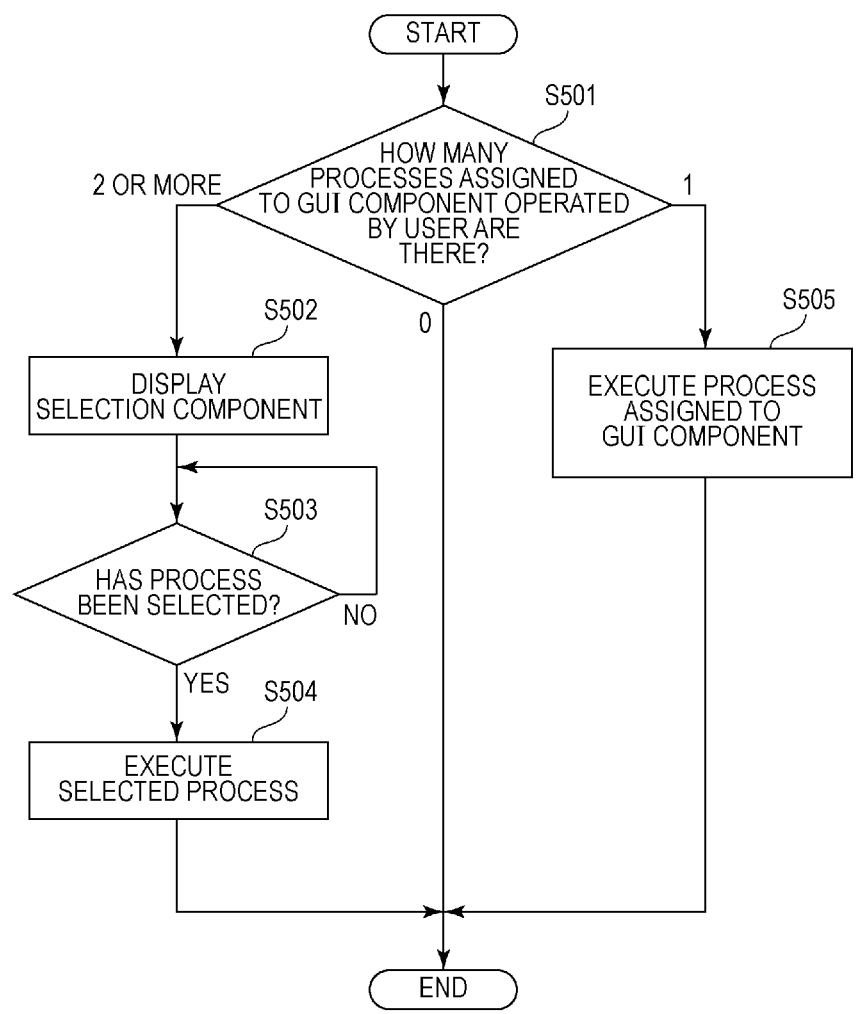

DISPLAY CONTROL APPARATUS, DISPLAY CONTROL METHOD, AND STORAGE MEDIUM

BACKGROUND OF THE INVENTION

Field of the Invention

The present application generally relates to display control and, more particularly, to a display control apparatus that controls a display of a display device, a display control method, and a storage medium storing a program.

Description of the Related Art

A graphical user interface (GUI) has been employed in various devices, such as a personal computer (PC) and a mobile phone. Here, unlike a character-based user interface (CUI) that is a user interface offering input/output operation using characters, the GUI is a user interface offering intuitive operation using computer graphics and a pointing device. The GUI is composed of GUI components, such as an icon and a button. A custom component is among the GUI components described herein. An example of a GUI component is a component, such as a button component, on which a character string may be displayed.

In the GUI, a technique is known in which a functional description of a user interface (hereinafter referred to as a UI) is displayed to a user by using a tooltip (see Japanese Patent Laid-Open No. 2007-66077). When the user points a cursor or pointer at an object, that is, superimposes the cursor or pointer on the object (hereinafter "to superimpose the cursor or pointer on the object" is also referred to as "to hover the cursor or pointer over the object"), the tooltip displays text, such as a functional description of the object, to the user. Use of the tooltip enables, specifically, a box to appear so as to cover the object and a detailed description to be displayed within the box. In the above configuration, when the user clicks the object, the function of the object is executed.

In a touch panel display equipped with a touch sensor on an entire screen, when the user directly touches an object on the display with part of a human body, such as a finger, or an instrument, such as a stylus pen, in place of a cursor or pointer, a predetermined function is executed.

However, in such a touch panel display, although a touch on the object (which corresponds to a click on the object) may be recognized, because a state corresponding to a hover state may not be able to be recognized, a process assigned to the object is executed upon touching the object.

Japanese Patent Laid-Open No. 2007-66077 discloses a method for generating a dedicated GUI screen for displaying a tooltip. However, in Japanese Patent Laid-Open No. 2007-66077, a guide key has to be prepared in order to generate the dedicated GUI screen. Complicated operation is also required in which the guide key is operated and then a GUI component on the dedicated GUI screen is operated.

As an operation method in which a hover state is simulated with a touch operation, a method of displacing an area with a finger or stylus pen touching the area is known; however, this method has a problem in that a tooltip may be concealed by the finger or stylus pen with which a touch operation is performed.

SUMMARY OF THE INVENTION

The present disclosure has been accomplished in order to solve the above-described problem. The present disclosure provides an apparatus including: a receiving unit configured to receive an input operation from a user performed on an accepting unit displayed on a display unit; a determination unit configured to determine whether or not detailed information set in the accepting unit is displayed on the display unit in accordance with the input operation received by the receiving unit, and at least one of a display state of the accepting unit and an input area of the input operation in the accepting unit; and a display control unit configured to control a display of the accepting unit displayed on the display unit in accordance with a determination result provided by the determination unit.

Further features of the present disclosure will become apparent from the following description of exemplary embodiments with reference to the attached drawings.

BRIEF DESCRIPTION OF THE DRAWINGS

FIG. 5 illustrates an example of a flowchart illustrating a procedure of deciding upon a process to be executed in response to a GUI operation according to the second embodiment.

DESCRIPTION OF THE EMBODIMENTS

Desirable embodiments of the present disclosure will be described in detail below with reference to the accompanying drawings. Note that the following embodiments are not intended to limit the present disclosure according to the claims and all combinations of features to be described in the embodiments are not necessarily essential in order to solve the problem to which the present disclosure is directed.

First Embodiment

Figure 1:
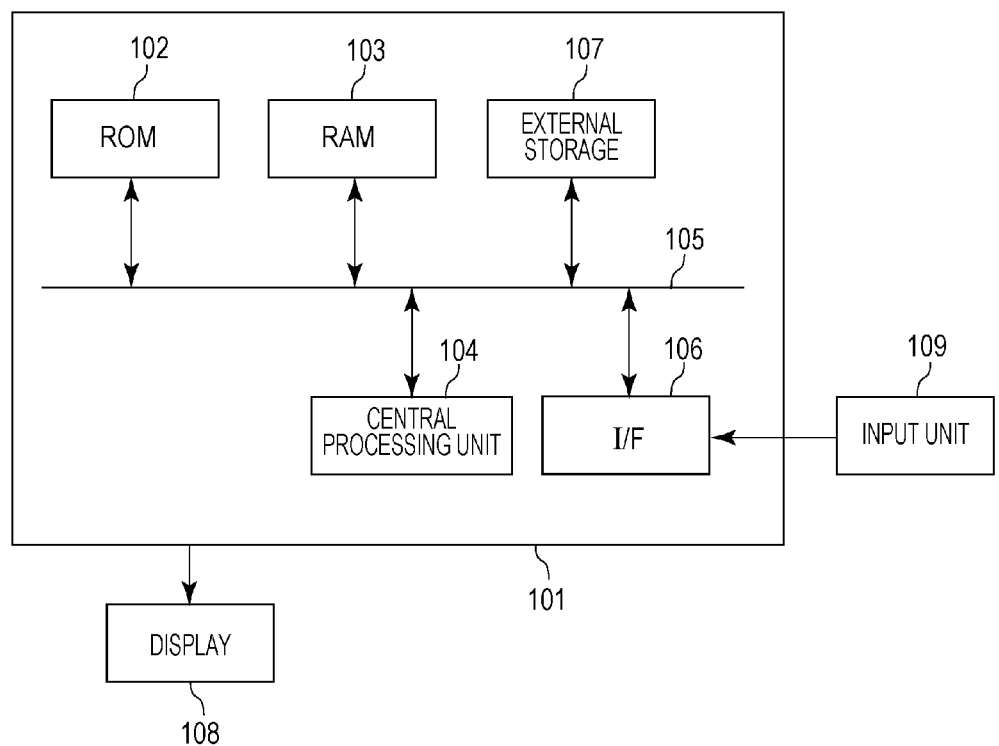
FIG. 1 illustrates the configuration of a host PC in which applications according to embodiments run.

FIG. 1 illustrates the general configuration of a host PC in which an application according to a first embodiment runs.

A host PC 101 includes a read only memory (ROM) 102, a random access memory (RAM) 103, a central processing unit 104, a bus 105, an interface (I/F) 106, and an external storage 107. The ROM 102, the RAM 103, the central processing unit 104, the I/F 106, and the external storage 107 are connected to each other via the bus 105, thereby enabling transmission and reception of data to and from each component.

The ROM 102 retains a control procedure, a processing procedure, and so forth that are executed by the central processing unit 104. Furthermore, an operating system (OS) and programs, such as applications, that are to be executed by the central processing unit 104 are stored in the ROM 102. For example, programs that implement operations illustrated in flowcharts in FIGS. 6 to 8 which will be described below are stored. The RAM 103 provides a storage area and a work area that are required for the operations performed by the above programs. The central processing unit 104 executes processes in accordance with the programs stored in the ROM 102 and executes a process of controlling an entire system of the host PC 101. As used herein, the term "unit" generally refers to any combination of software, firmware, hardware, or other component that is used to effectuate a purpose.

A display 108 is an output device that displays a GUI of an application. The display 108 may be provided separately from or integrated with the host PC 101. This display 108 may be connected to the host PC 101 either directly or via a network or the like. In this embodiment, the display 108 is integrated with the host PC 101.

An input unit 109 is a unit that accepts an input from a user, and the input unit 109 provides an instruction to and sets settings for the host PC 101. Examples of the input unit 109 include a mouse, a keyboard, and a touch display panel. The I/F 106 is connected to the input unit 109 and receives an input operation performed using the input unit 109.

In this embodiment, a touch display panel has both the functions of the display 108 and the input unit 109.

Figure 2A:
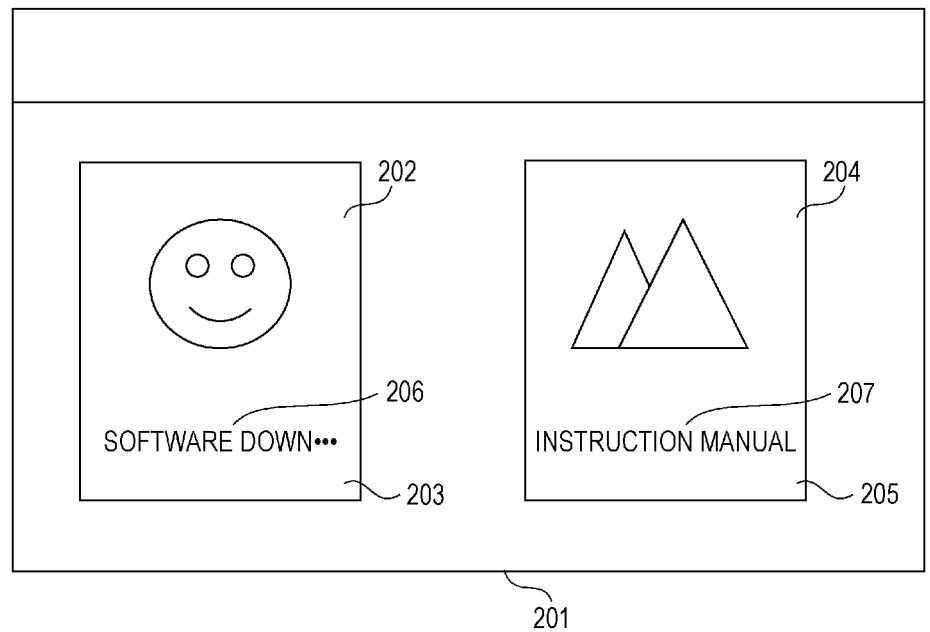
FIGS. 2A and 2B each illustrate a GUI of an application according to a first embodiment.
Figure 2B:
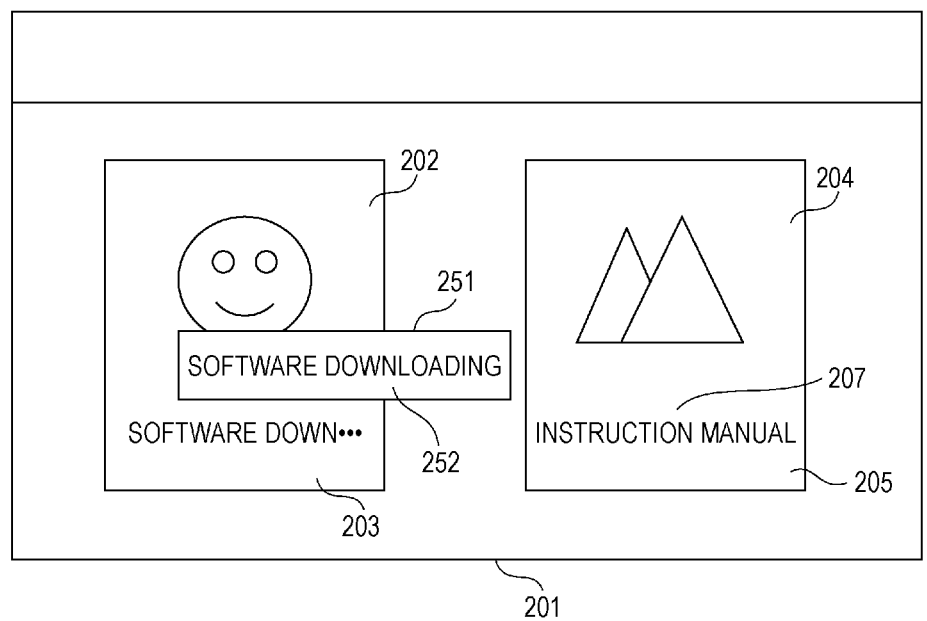

FIGS. 2A and 2B each illustrate a GUI of the application according to this embodiment. This application accepts an input from the user performing a touch operation and then runs. The touch operation described herein may be an operation performed using part of a human body, such as a finger, or an instrument, such as a stylus pen.

As illustrated in FIG. 2A, the display 108 displays the GUI of the application according to this embodiment on a screen display area 201. The application according to this embodiment includes button components 202, 203, 204, and 205. Predetermined functions are respectively assigned to the button components 202, 203, 204, and 205, and graphics representing the respective functions are displayed on the button components (202 and 204), respectively. These functions are executed by touching the respective button components. The same function is assigned to the button component 202 and the button component 203, and a display in which the button components 202 and 203 are integrated such that a boundary between them is not able to be visually recognized is provided. Similarly, the same function is assigned to the button component 204 and the button component 205, and a display in which the button components 204 and 205 are integrated such that a boundary between them is not able to be visually recognized is provided. On the button component 203, the button component 202 and a character string (hereinafter referred to as a button name) describing the function of the button component 203 are displayed. Similarly, on the button component 205, the button component 204 and a character string describing the function of the button component 205 are displayed. Here, in the case where the button name is long and the entire character string describing the function is not able to be displayed in a display area of the button component 203 or the button component 205, in a state in which no button component has been selected, part of the character string is omitted. The number of characters in a character string that is able to be displayed here is changed in accordance with a character size, a size of a display resolution of a button component, and/or the like that are set in the OS.

In this embodiment, as a function, a software downloading function is assigned to the button component 202 and the button component 203. As a function, an instruction manual display function is assigned to the button component 204 and the button component 205. The button names are "software downloading" and "instruction manual". As illustrated in FIG. 2A, on the button component 203, a character string "software down . . . " 206 corresponding to the button name is displayed. On the button component 205, a character string "instruction manual" 207 corresponding to the button name is displayed. Here, " . . . ", which is part of the character string 206, represents the part of the button name that has been omitted.

In this embodiment, in the case where part of a button name has been omitted, when a touch operation on a button component on which this button name is displayed is accepted, a tooltip component is displayed on a screen display area. Within this tooltip component, a character string representing the button name including the omitted part is displayed. For example, when a touch operation on the button component 203 is performed, a tooltip component 251 is displayed as illustrated in FIG. 2B. On the tooltip component 251, a character string 252 "software downloading" is displayed. Here, examples of a tooltip component include a tooltip and a flyout. Here, the tooltip is a component capable of displaying text, and the flyout is a component capable of displaying text, setting a button, such as a radio button, setting a box, such as a combo box, or the like. In this embodiment, a predetermined character string is displayed by using a flyout.

As described above, before the user performs a touch operation, in the case where the button name corresponding to the function of the button components 202 and 203 is long and the entire button name is not able to be displayed within the display area, a character string ("software down . . . ") in which part of the button name has been omitted is displayed. However, when the user performs a touch operation on the button component 203, the tooltip component 251 is displayed, and then the entire button name is displayed on this tooltip component 251. That is, the entire character string (button name) including the part thereof which has been omitted on the button component 203 is displayed on the tooltip component 251. Thus, as detailed information set in the button component 203, the name of the function assigned to the button component 203, specifically, "software downloading" is displayed on the tooltip component 251.

Here, the construction of a GUI screen, and a GUI component will be described. The GUI screen is constructed by combining GUI components. Here, as an example, a GUI screen of the application displayed on the screen display area 201 of the display 108 illustrated in FIGS. 2A and 2B will be described. The GUI screen of the application is constructed by adding the button components 202, 203, 204, and 205 to a panel component having the same size as the screen display area 201. In the GUI screen, a component to which a component has been added may further be added to another component.

A GUI component capable of setting a character string in the component itself is among the GUI components. In the case of a GUI component capable of setting a predetermined character string in the component itself, the set character string is displayed on the GUI component. For example, the button component 203 is capable of setting a predetermined character string. As illustrated in FIG. 2A, as a character string, "software downloading" is set in the button component 203, and the set character string is thereby displayed on the button component 203. Display of a character string is not limited to display of a character string using a button component that sets a character string in the component itself; alternatively, for example, a character string may be displayed by using a label component for displaying a character string, in addition to the button component. In this case, the label component may be arranged on a component.

Each GUI component has a unit that registers an object which receives a notification of an event having occurred to the GUI component. When an event occurs to a GUI component, a notification of the event is provided to a registered event control object (event listener). A process to be executed in response to the event having occurred is written in the event listener in advance. That is, a process for executing a function assigned to a button component is written. For example, a process for downloading software is written in an event listener so that the software is downloaded in response to an event in which a notification of the fact that the button component 202 has been touched (depressed) is provided.

In this embodiment, both execution of a function assigned to a button component and display of a tooltip component are implemented by touching the GUI screen of the application. When a button component is touched, a determination process regarding the button component on which a touch operation has been performed is executed, and then it is decided to execute a function assigned to the button component or display a tooltip component.

Figure 3:
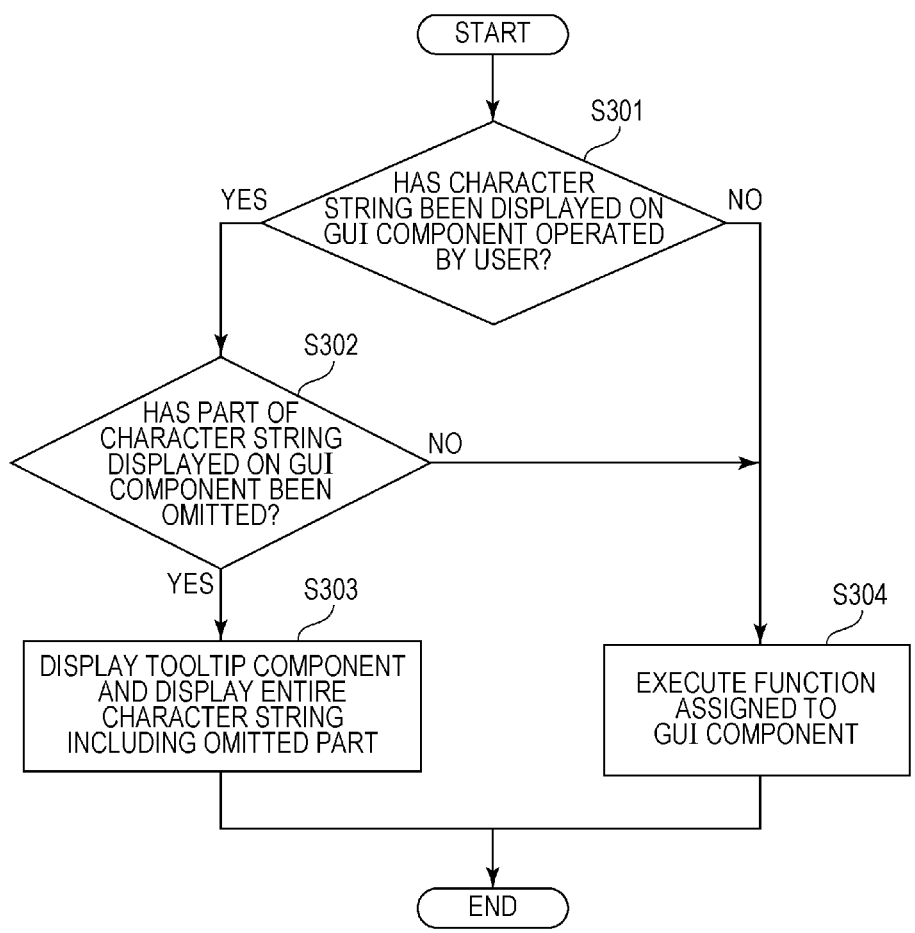
FIG. 3 is a flowchart illustrating a procedure of deciding upon a process to be executed in response to a GUI operation according to the first embodiment.

Details of a process executed when the operation illustrated in FIGS. 2A and 2B is performed will be described below with reference to FIG. 3. FIG. 3 is a flowchart of a process executed by the central processing unit 104 when the GUI screen of the application is touched.

First, when a notification of the fact that a button component serving as a GUI component which constitutes the GUI of the application has been operated is provided, in step S301, it is determined whether or not a character string has been displayed on the GUI component operated by the user. Character strings to be targeted for determination may be a character string set in the GUI component itself and a character string set in another GUI component arranged on the GUI component, or alternatively, a character string to be targeted for determination may be either of these above character strings. In this embodiment, character strings are set in the button component 203 and the button component 205, respectively, and, here, it is respectively determined whether or not the character strings have been displayed on the respective GUI components themselves. When it is determined that a character string has been displayed on the operated GUI component, the process flow proceeds to step S302. On the other hand, when it is determined that no character string has been displayed on the operated GUI component, the process flow proceeds to step S304 and a function assigned to the GUI component is executed.

In step S302, it is determined whether or not part of the character string displayed on the operated GUI component has been omitted. An omission process of omitting part of a character string may be a process executed by software (the OS etc.) other than the application according to this embodiment, or a process executed by the application itself. A method in which the omission process is executed by the application itself is not particularly limited. An example of the method is a method in which the number of characters that are able to be displayed on a GUI component is determined in accordance with size information of the GUI component, characters in a character string are displayed by the number of characters that are able to be displayed, and remaining characters are omitted. When it is determined that part of the character string displayed on the GUI component has been omitted, the process flow proceeds to step S303. When it is not determined that part of the character string displayed on the GUI component has been omitted, that is, when part of the character string has not been omitted, the process flow proceeds to step S304 and the function assigned to the GUI component is executed.

In step S303, a tooltip component assigned to the GUI component is displayed. Then, the entire character string including the omitted part is displayed on the tooltip component. In other words, detailed information set in the GUI component is displayed on the tooltip component.

Here, for a character string displayed on a GUI component and a character string set in a tooltip component, the same character string stored in a program may serve as a resource, or alternatively, different character strings may serve as resources. In the case where different character strings are prepared as resources, a short character string and a long character string are separately prepared in advance. When it is determined that the long character string is not able to be displayed on a GUI component, the short character string may be displayed. In this case, in step S302, in place of a determination as to whether or not part of a character string has been omitted, a determination as to whether or not the short character string has been displayed may be made.

Here, the flowchart in FIG. 3 will be described by taking the application illustrated in FIGS. 2A and 2B as an example.

First, when a notification of the fact that any of the button components 202, 203, 204, and 205 on the screen display area 201 has been operated is provided, the state of the operated button component is determined, and then a subsequent operation is decided upon.

When a notification of the fact that the button component 202 or 204 has been operated is provided, it is determined whether or not a character string has been displayed on the button component 202 or 204 (step S301). Here, since no character string has been displayed on the button component 202 or 204 (No in step S301), the function assigned to the button component 202 or 204 is executed (step S304). When a notification of the fact that the button component 203 has been operated is provided, it is determined whether or not a character string has been displayed on the button component 203. Since a character string has been displayed (Yes in step S301), the process flow proceeds to step S302. Subsequently, it is determined whether or not part of the button name has been omitted in the character string "software down . . ." 206 displayed on the button component 203 (step S302). Here, part of the button name "software downloading" has been omitted in the character string "software down . . ." 206 (Yes in step S302), and a tooltip component has been assigned to the button component 203. Hence, the tooltip component 251 assigned to the button component 203 is displayed, and then the entire character string "software downloading" 252 including the part omitted in the character string "software down . . ." 206 is displayed (step S303). In this way, in this embodiment, control is performed so that the function assigned to the button component 203 is not executed, and control is performed so that the entire character string is displayed by performing a touch operation on the button component 203 or the character string 206 on the button component 203.

When a notification of the fact that the button component 205 has been operated is provided, it is determined whether or not a character string has been displayed on the button component 205. Since a character string has been displayed (Yes in step S301), the process flow proceeds to step S302. Subsequently, it is determined whether or not part of the character string has been omitted in the character string "instruction manual" 207 displayed on the button component 205 (step S302). Here, since part of the button name "instruction manual" has not been omitted (No in step S302), the function assigned to the button component 205 is executed (step S304).

As described above, in this embodiment, button component areas are displayed separately, thereby enabling, in a touch display incapable of recognizing a hover state, appropriate description of a function (detailed display of a button name) and appropriate execution of a function. That is, even in a touch display incapable of recognizing that an object has been pointed at, detailed display of a button name and execution of a function may be performed appropriately. Specifically, in accordance with a determination result as to whether or not part of a button name has been omitted, the button name is displayed in detail with a tooltip component, or a function is executed, thereby allowing the user to easily execute an intended function. In this embodiment, when the user performs a touch operation on the button component 203, the user may check the function assigned to the button component 202 and the button component 203. On the other hand, when the user performs a touch operation on the button component 202, the user may execute the function set in the button component 202 and the button component 203. When the user performs a touch operation on the button component 204 or the button component 205, the user may execute the function set in the button components 204 and 205.

In order to display the entirety of a relatively long character string, when the size of an entire GUI is increased and a GUI component area is enlarged, the entire GUI does not fit inside one screen, thereby resulting in a reduction in viewability. In order to display the entirety of a relatively long character string, when only the size of a target GUI component is increased, the layout of the entire GUI is distorted, and when the font size of a character string on the GUI component is decreased, some sizes reduce visibility. In contrast to this, in this embodiment, even when an area for displaying a character string is narrow, a process appropriate to a user's intention may be executed with a balance or visibility in the GUI maintained.

Second Embodiment

In the first embodiment, in accordance with whether or not part of a character string displayed on an operated GUI component has been omitted, it is decided whether or not to display a tooltip component; however, in a second embodiment, a user is caused to select a process to be executed. Note that components that are the same as those in the first embodiment are denoted by the same reference numerals, and repeated description thereof is omitted.

Figure 4A:
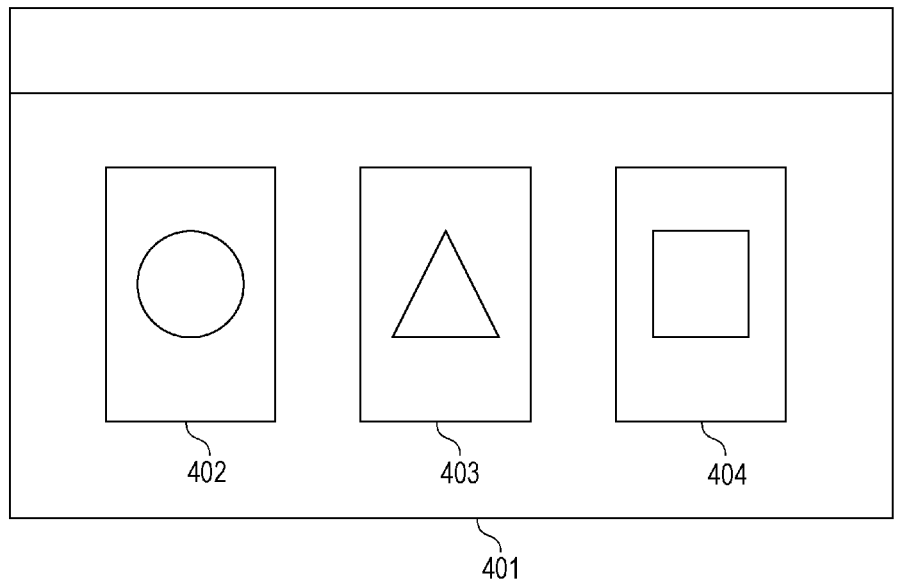
FIGS. 4A and 4B each illustrate a GUI of an application according to a second embodiment.
Figure 4B:
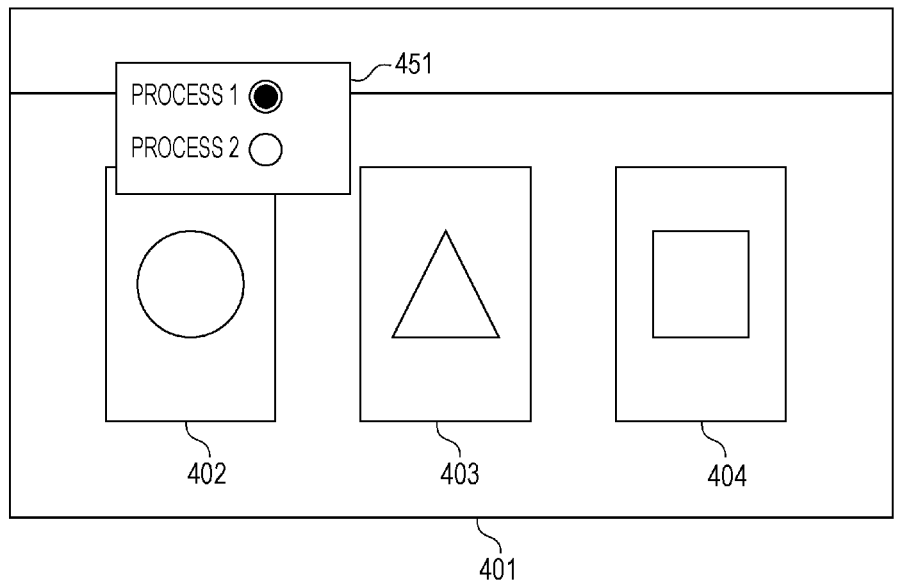

FIGS. 4A and 4B each illustrate a GUI of an application according to this embodiment. This application accepts an input from the user performing a touch operation and then runs.

In FIGS. 4A and 4B, a reference numeral 401 denotes an application screen display area on which the GUI of the application is displayed. As illustrated in FIG. 4A, the display 108 displays the GUI of the application according to this embodiment on the screen display area 401. The application according to this embodiment includes button components 402, 403, and 404. Two processes are assigned to the button component 402, and one process is assigned to the button component 403. Graphics representing functions are displayed on the button component 402 and the button component 403, respectively. These processes are executed in response to operation of the respective button components. In this embodiment, there is provided a button component 404 to which no process is assigned and on which a graphic is merely displayed.

FIG. 4B illustrates a state in which a tooltip component 451 has been displayed by operating the button component 402. As illustrated in FIG. 4B, when a touch operation on the button component 402 is accepted, the tooltip component 451 is displayed on the button component 402 on the screen display area 401. On the tooltip component 451, a list of processes for a function assigned to the button component 402 is displayed. Hereinafter, the tooltip component 451 is also referred to as a selection component 451. In this embodiment, the two processes assigned to the button component 402 are a process 1 and a process 2. The functions are not particularly limited, and examples of the functions include a print function, a scan function, and a facsimile function. Furthermore, examples of processes for the respective functions may include display of the print function, execution of the print function, display of the scan function, execution of the scan function, display of the facsimile function, and execution of the facsimile function. In this embodiment, the two processes assigned to the button component 402 are a process of displaying a predetermined function assigned to the button component 402 with a tooltip component, and a process of executing the predetermined function assigned to the button component 402.

In this embodiment, when a touch operation on the button component 402 is performed, the selection component 451 is displayed. The user is able to select, by using the selection component 451, a process to be executed. That is, the user selects a process with the selection component 451, and thereby the selected process is executed.

FIG. 5 illustrates details of a process executed when the operation illustrated in FIGS. 4A and 4B in this embodiment is performed. FIG. 5 illustrates an example of a flowchart of a process executed by the central processing unit 104 when a GUI screen of the application is touched in this embodiment.

First, when a notification of the fact that a button component which constitutes the GUI of the application has been operated is provided, in step S501, it is determined how many processes assigned to the button component operated by the user there are. In this embodiment, it is determined which of 0, 1, and 2 or more the number of processes assigned to the button component is. When two or more processes have been assigned to the button component (2 or more in step S501), the process flow proceeds to step S502. When one process has been assigned to the button component (1 in step S501), the process flow proceeds to step S505 and the assigned process is executed. When no process has been assigned to the button component (0 in step S501), no process is executed.

In step S502, a tooltip component (also referred to as a selection component) for causing the user to select a process to be executed is displayed. That is, as detailed information set in the button component on which a touch operation has been performed, processes assigned to the button component are displayed on the tooltip component. Subsequently, the process flow proceeds to step S503 and it is determined whether or not a process has been selected in the selection component. When a process has been selected in the selection component by the user, the selected process is executed in step S504.

In this embodiment, when a touch operation on an area other than the tooltip component 451 is performed while the tooltip component 451 is being displayed, selection of a process corresponding to the button component on which a touch operation has been performed may be assumed to be cancelled.

The process illustrated in the flowchart in FIG. 5 will be described by taking the application illustrated in FIGS. 4A and 4B as an example.

When a notification of the fact that the button component 402 has been operated is provided, it is determined how many processes assigned to the button component 402 there are (step S501). Since the two processes have been assigned to the button component 402 (2 or more in step S501), the tooltip component 451 for causing the user to select a process to be executed is displayed (step S502). Subsequently, the process flow proceeds to the step S503 and the process selected by the user is executed. For example, in step S502, when the user selects a process of displaying a predetermined function with a tooltip component, the tooltip component is displayed, and when the user selects a process of executing the function, the predetermined function is executed. When a notification of the fact that the button component 403 has been operated is provided, it is determined how many processes assigned to the button component 403 there are (step S501). Since the one process has been assigned to the button component 403 (1 in step S501), the assigned process is executed (step S505). When a notification of the fact that the button component 404 has been operated is provided, it is determined how many processes assigned to the button component 404 there are (step S501). Since no process has been assigned to the button component 404 (0 in step S501), the process flow ends.

Figure 6:
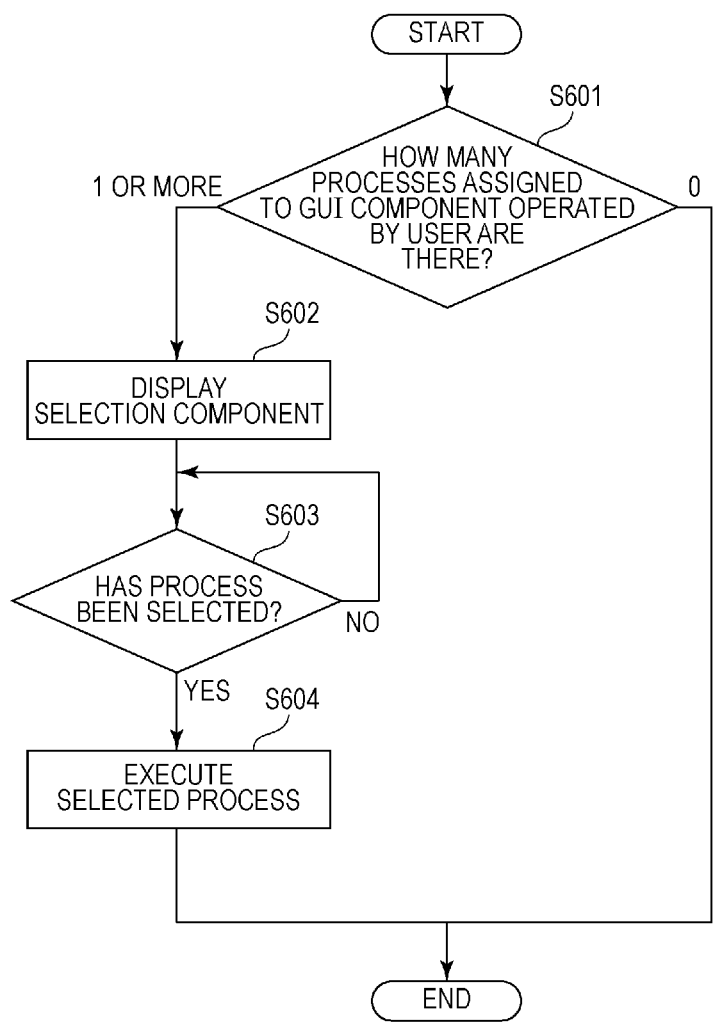
FIG. 6 illustrates an example of a flowchart illustrating a procedure of deciding upon a process to be executed in response to a GUI operation according to the second embodiment.

In the above example, the processing is executed in which a GUI component that causes the user to select a process to be executed is displayed when the number of processes assigned to an operated GUI component is two or more; however, the processing is not limited to this. Even in the case where one process has been assigned to an operated GUI component, a GUI component for causing the user to select a process to be executed may be displayed. FIG. 6 illustrates another example of a flowchart of a process executed by the central processing unit 104 when the GUI screen of the application is touched in this embodiment. As illustrated in the flowchart in FIG. 6, in step S601, it is determined whether or not the number of processes assigned to a GUI component operated by the user is one or more. When the number is one or more, the process flow proceeds to step S602 and a selection component is displayed. Then, it is determined whether or not a process has been selected in step S603. When a process has been selected, the process flow proceeds to step S604 and the selected process is executed.

As described above, in this embodiment, in a touch display incapable of recognizing a hover state, the user may easily and appropriately execute a process in accordance with the number of processes assigned to a button component. That is, even in a touch display incapable of recognizing that a button component has been pointed at, a process that a user intends to execute among processes assigned to the button component may be executed appropriately. In this embodiment, in accordance with a determination result as to whether or not the number of processes assigned to a button component operated by the user is two or more, the processes assigned to the button component are displayed with a selection component, or a process is executed. Specifically, when a touch operation on the button component 402 is accepted, the selection component 451 is displayed and then the processes assigned to the button component 402 are displayed on the selection component 451. Thus, for example, display of processes and execution of a process may be performed appropriately. When the number of processes assigned to the button component is one, a process is executed by performing a touch operation on the button component.

In this embodiment, as in the first embodiment, even when an area for displaying a character string is narrow, a process appropriate to a user's intention may be executed with a balance or visibility in the GUI maintained.

Third Embodiment

In the first embodiment, in accordance with whether or not part of a character string displayed on an operated GUI component has been omitted, it is decided whether or not to display a tooltip component; however, in a third embodiment, in accordance with an area on a GUI component which has been operated, a process to be executed is decided upon. Note that components that are the same as those in the first embodiment are denoted by the same reference numerals, and repeated description thereof is omitted.

Figure 7A:
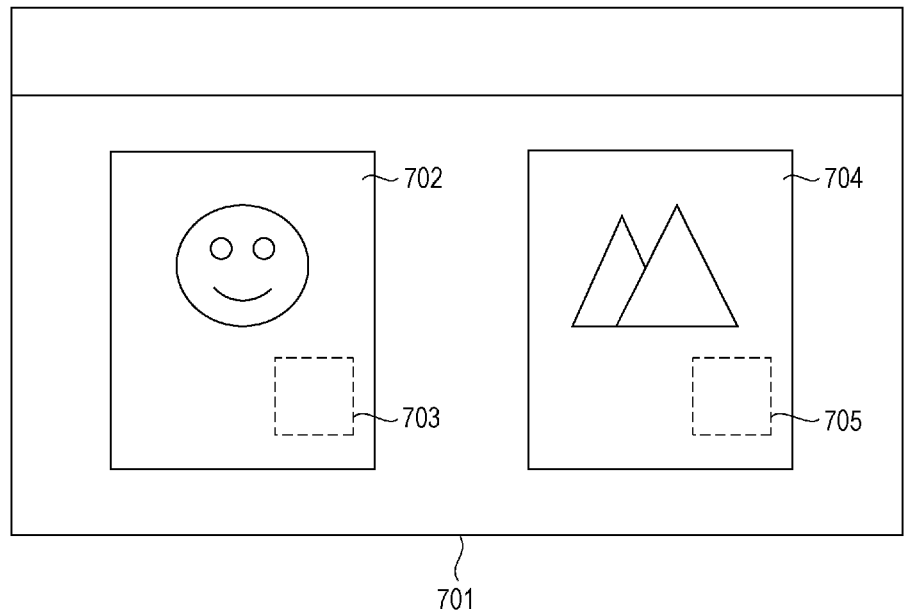
FIGS. 7A and 7B each illustrate a GUI of an application according to a third embodiment.
Figure 7B:
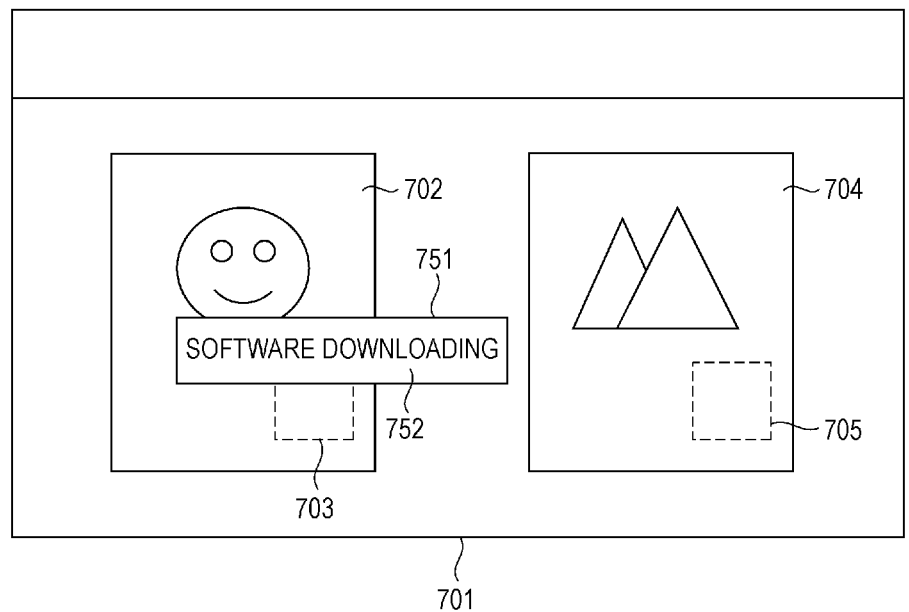

FIGS. 7A and 7B each illustrate a GUI of an application according to this embodiment. This application accepts an input from a user performing a touch operation and then runs.

In FIGS. 7A and 7B, a reference numeral 701 denotes an application screen display area on which the GUI of the application is displayed. As illustrated in FIG. 7A, in this embodiment, the display 108 displays the GUI of the application on the screen display area 701. The application according to this embodiment includes a button component 702 and a button component 704. Two processes are assigned to each of the button components 702 and 704. In this embodiment, for each area in each button component, a different process is assigned. As illustrated in FIG. 7A, in the button component 702, an area 703 is distinct from an area other than it, and, in the button component 704, an area 705 is distinct from an area other than it. Also, in this embodiment, the area 703 and the area 705 are displayed such that they are able to be visually recognized; however, they may be displayed such that they are not able to be visually recognized.

In this embodiment, in both the button components 702 and 704, one of the assigned processes is a process of displaying a tooltip component for describing a function of a button component. The other process, that is, a process other than the process of displaying the tooltip component is a process of executing the function assigned to the button component. Graphics representing functions are displayed on the button components (702 and 704), respectively. Processes of displaying tooltip components for describing functions assigned to the button components 702 and 704 are assigned to the area 703 and the area 705, respectively. A process of executing the function assigned to the button component 702 is set in the area other than the area 703 in the button component 702, and a process of executing the function assigned to the button component 704 is set in the area other than the area 705 in the button component 704.

When a touch operation on the area 703 in the button component 702 is performed, the process assigned to the area 703 is executed. Specifically, the tooltip component for describing the function assigned to the button component 702 is displayed. On the other hand, when a touch operation on the area other than the area 703 in the button component 702 is performed, the other process is executed. Similarly, when a touch operation on the area 705 in the button component 704 is performed, the tooltip component for describing the function assigned to the button component 704 is displayed, and, when a touch operation on the other area is performed, the other process is executed.

FIG. 7B illustrates a state in which a tooltip component 751 has been displayed by operating the area 703 on the button component 702. When a touch operation on the button component 702 is accepted, the tooltip component 751 is displayed on the button component 702 on the screen display area 701. On the tooltip component 751, text "software downloading" 752 describing the function assigned to the button component 702 is displayed.

Figure 8:
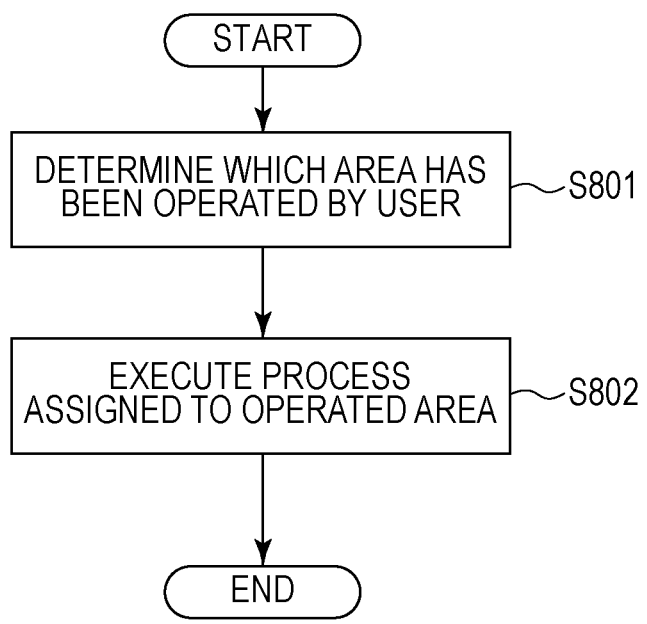
FIG. 8 is a flowchart illustrating a procedure of deciding upon a process to be executed in response to a GUI operation according to the third embodiment.

FIG. 8 is a flowchart of a process executed by the central processing unit 104 when a GUI screen of the application is touched.

First, when a notification of the fact that a GUI component which constitutes the GUI of the application has been operated by the user is provided, in step S801, it is determined which area on the GUI component has been operated. Subsequently, the process flow proceeds to step S802 and a process corresponding to the operated area is executed.

Here, the flowchart in FIG. 8 will be described by taking the application illustrated in FIGS. 7A and 7B as an example.

When a notification of the fact that the button component 702 on the screen display area 701 has been operated is provided, it is determined which area on the button component 702 has been operated (step S801). As a result, when it is determined that the area 703 has been operated, the tooltip component 751 for describing the function of the button component 702 is displayed. On the other hand, when it is determined that the area other than the area 703 has been operated, the process other than the process of displaying the tooltip component 751 is executed (step S802). That is, when it is determined that the area 703 has been operated, as detailed information set in the button component 702, the name of the function assigned to the button component 702, specifically, "software downloading" is displayed on the tooltip component 751.

As described above, in this embodiment, in a touch display incapable of recognizing a hover state, the user may easily and appropriately execute a process in accordance with an area on a button component on which a touch operation has been performed. That is, even in a touch display incapable of recognizing that a button component has been pointed at, display of a function of the button component and execution of the function of the button component may be performed appropriately. In this embodiment, when the user performs a touch operation on a predetermined area (area 703 or area 705) on a button component, a tooltip component is displayed, thereby causing the user to recognize a function assigned to the button component. When the user performs a touch operation on an area other than the predetermined area on the button component, the function assigned to the button component is executed. Thus, for example, a process of displaying a function and a process of executing the function may be performed appropriately. When the number of processes assigned to a button component is one, the button component does not have to be divided into a plurality of areas, and the function of the button component may be executed by the user performing a touch operation on the button component.

In this embodiment, as in the first embodiment, even when an area for displaying a character string is narrow, a process appropriate to a user's intention may be executed with a balance or visibility in the GUI maintained.

Fourth Embodiment

In the first embodiment, in accordance with whether or not part of a character string displayed on an operated GUI component has been omitted, it is decided whether or not to display a tooltip component; however, in a fourth embodiment, in accordance with the number of times a GUI component has been operated, a process to be executed is decided upon. Note that components that are the same as those in the first embodiment are denoted by the same reference numerals, and repeated description thereof is omitted.

Figure 9A:
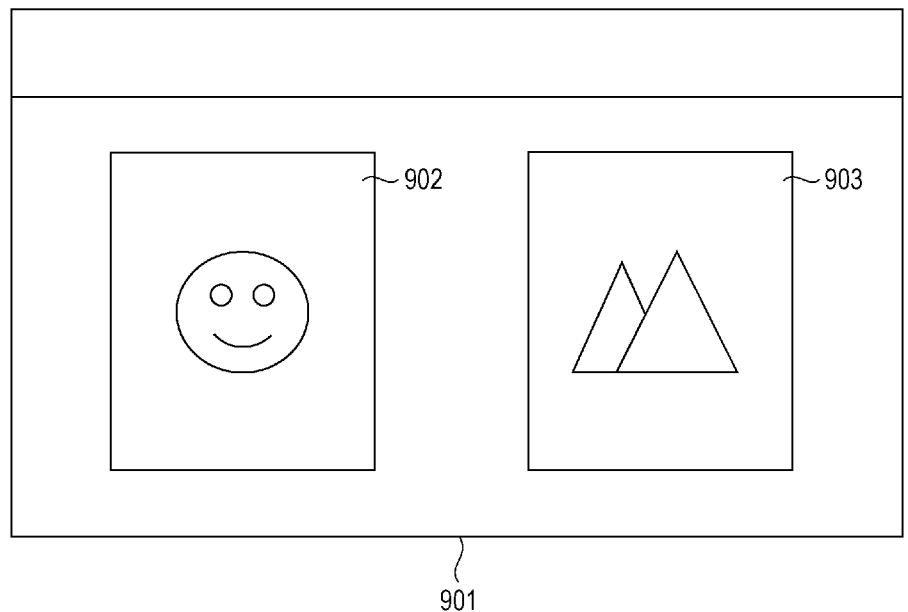
FIGS. 9A and 9B each illustrate a GUI of an application according to a fourth embodiment.
Figure 9B:
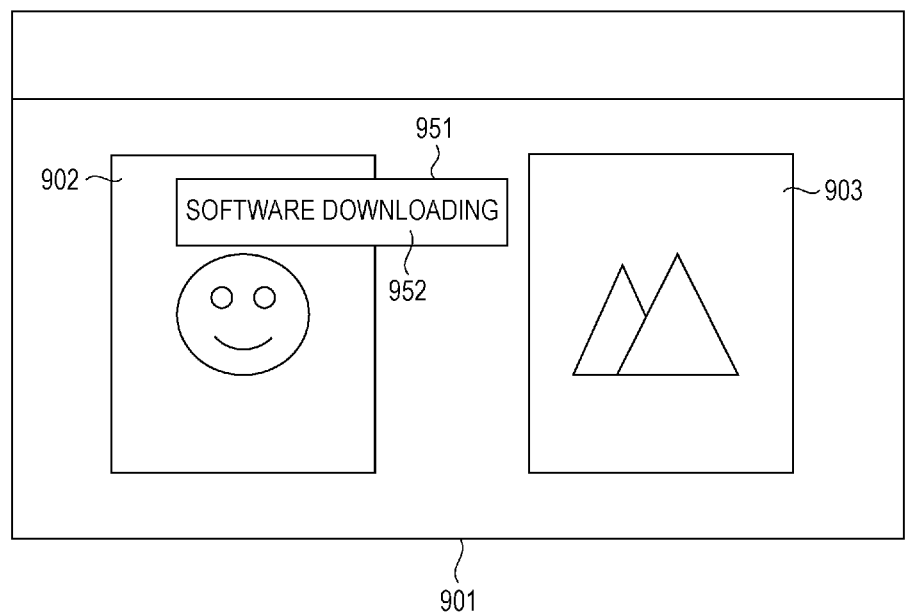

FIGS. 9A and 9B each illustrate a GUI of an application according to this embodiment. This application accepts an input from a user performing a touch operation and then runs. In FIGS. 9A and 9B, a reference numeral 901 denotes an application screen display area on which the GUI of the application is displayed. As illustrated in FIG. 9A, in this embodiment, the display 108 displays the GUI of the application on the screen display area 901. The application according to this embodiment includes button components 902 and 903. Two processes are assigned to each of the button components 902 and 903. One of the assigned processes is a process of displaying a tooltip component for describing a function of a button component. The other process, that is, a process other than the process of displaying the tooltip component is a process of executing the function assigned to the button component. Graphics representing functions are displayed on the button components (902 and 903), respectively. The two processes assigned to each of the button components 902 and 903 are executed when the button components 902 and 903 are each operated.

FIG. 9B illustrates a state in which a tooltip component 951 has been displayed by performing a touch operation on the button component 902. When a touch operation on the button component 902 is accepted, the tooltip component 951 is displayed on the button component 902 on the screen display area 901. On the tooltip component 951, text "software downloading" 952 describing the function of the button component 902 is displayed.

Figure 10A:
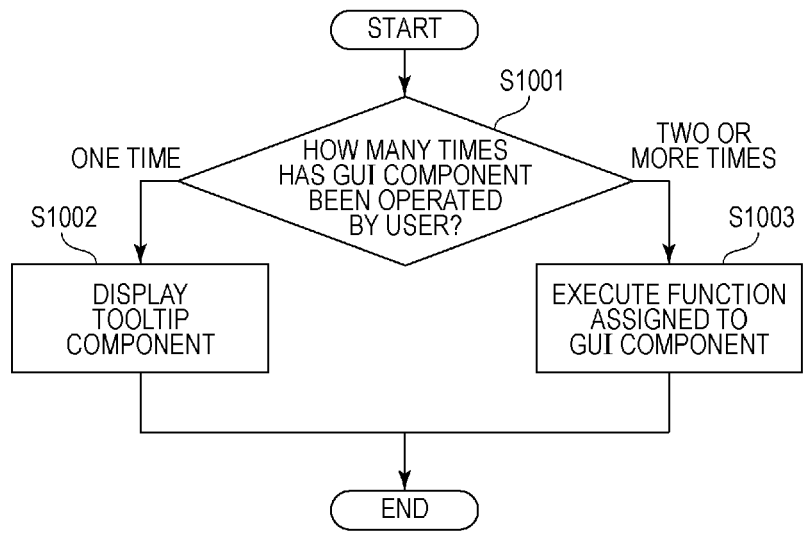
FIGS. 10A and 10B are each a flowchart illustrating a procedure of deciding upon a process to be executed in response to a GUI operation according to the fourth embodiment.

FIG. 10A illustrates an example of a flowchart of a process executed by the central processing unit 104 when a GUI screen of the application is touched.

First, when a notification of the fact that a button component which constitutes the GUI of the application has been operated by the user is provided, in step S1001, it is determined how many times the button component has been operated. Here, when it is determined that the button component has been operated for the first time (one time in step S1001), the process flow proceeds to step S1002 and a tooltip component for describing a function assigned to the button component is displayed. That is, as detailed information set in the button component, the name of the function assigned to the button component, specifically, "software downloading" is displayed on the tooltip component. On the other hand, when it is determined that the button component has been operated two or more times (two or more times in step S1001), the process flow proceeds to step S1003 and the function assigned to the button component is executed.

Here, the flowchart in FIG. 10A will be described by taking the application illustrated in FIGS. 9A and 9B as an example. When a notification of the fact that the button component 902 on the screen display area 901 has been operated is provided, in step S1001, it is determined how many times the button component 902 has been operated. As a result, when it is determined that the button component 902 has been operated for the first time (one time in step S1001), the tooltip component 951 for describing the function assigned to the button component 902 is displayed. On the other hand, when it is determined that the button component 902 has been operated two or more times (two or more times in step S1001), the function assigned to the button component 902 are executed.

Figure 10B:
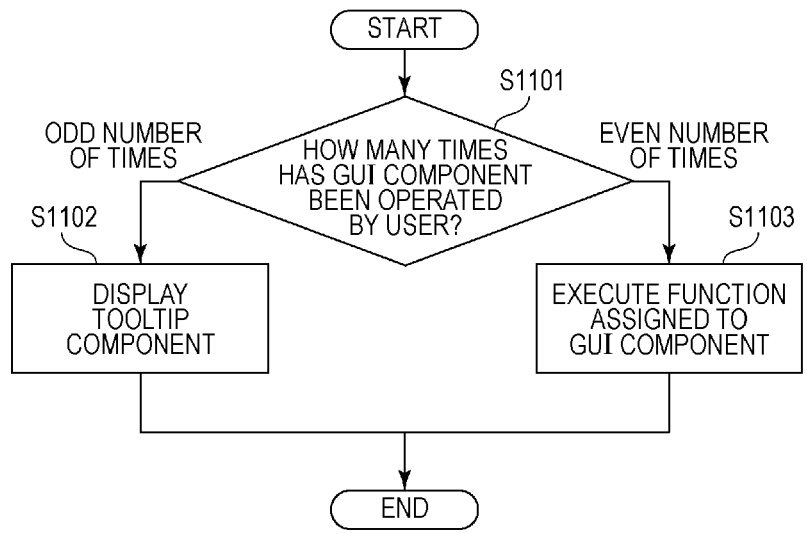

In the above example, the processing is executed in which a process to be executed is changed in accordance with whether or not the number of times a button component has been operated by the user is one time; however, the processing is not limited to this. For example, in the case where the number of processes assigned to an operated button component is two or more, a process to be executed may be changed in accordance with whether or not the number of times a touch operation has been performed is an odd number of times. FIG. 10B illustrates another example of a flowchart of a process executed by the central processing unit 104 when the GUI screen of the application is touched in this embodiment. As illustrated in the flowchart in FIG. 10B, when a touch operation on a button component is accepted, in step S1101, it is determined whether the number of times the button component has been operated by the user is an odd number of times or an even number of times. When the number of times an operation has been performed is an odd number of times, the process flow proceeds to step S1102 and a tooltip component is displayed. On the other hand, when the number of times an operation has been performed is an even number of times, the process flow proceeds to step S1103 and a function assigned to the button component is executed. In this way, when the number of times a touch operation has been performed is an odd number of times (1, 3, . . . times), a description of the function assigned to the button component is displayed, and, when the number of times a touch operation has been performed is an even number of times (2, 4, . . . times), the function assigned to the button component is executed. According to this configuration, display of the function assigned to the button component and execution of the function may be alternately performed. That is, the user may check the function and then execute processing.

In this embodiment, as illustrated in FIGS. 10A and 10B, in order to determine how many times an operation has been performed, the number of times an operation has been performed is counted; however, the count may be reset at a certain count (for example, a count of four) and then the number of times may be counted again. The number of times an operation has been performed does not have to be counted. For example, display of a function assigned to a button component and execution of the function may be alternately performed whenever a touch operation is performed.

As described above, in this embodiment, in a touch display incapable of recognizing a hover state, the user may easily and appropriately execute a process in accordance with the number of times a touch operation on a button component has been performed. That is, even in a touch display incapable of recognizing that a button component has been pointed at, display of a function of the button component and execution of the function of the button component may be performed appropriately. In this embodiment, in accordance with a determination result as to whether or not the number of times a touch operation on a button component has been performed by the user is a predetermined number of times, detailed display of a button name with a tooltip component, or execution of a function is performed. That is, when the number of times a touch operation on the button component has been performed by the user is a predetermined number of times, the tooltip component is displayed, thereby causing the user to recognize the function assigned to the button component. When the number of times a touch operation on the button component has been performed by the user is not the predetermined number of times, the function assigned to the button component is executed. Thus, for example, a process of displaying a function and a process of executing the function may be performed appropriately. When the number of processes assigned to a button component is one, a function may be executed at all times regardless of the number of times a touch operation on the button component has been performed by the user.

In this embodiment, as in the first embodiment, even when an area for displaying a character string is narrow, a process appropriate to a user's intention may be executed with a balance or visibility in the GUI maintained.

Other Embodiments

Each embodiment of the present disclosure has been described hereinabove, and a basic configuration according to the present disclosure is not limited to the above description.

For example, in the first embodiment, a determination as to whether or not part of a character string on a GUI component has been omitted is made after operation of the GUI component has been detected; alternatively, this determination may be made at a point in time when a GUI screen is displayed.

Figure 11:
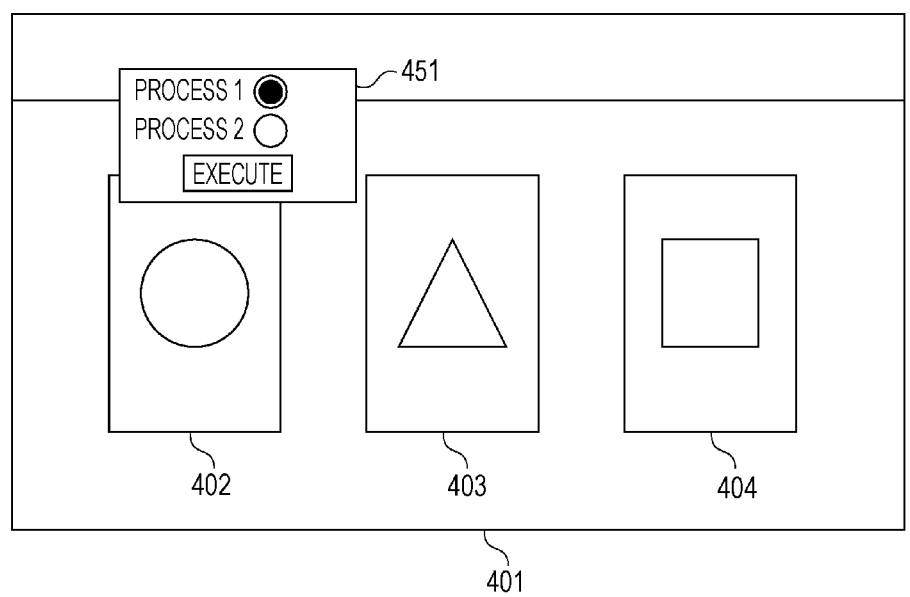
FIG. 11 illustrates a GUI of an application according to another embodiment.

In the first and second embodiments, an execute button may be displayed on a tooltip component. For example, as illustrated in FIG. 11, in the second embodiment, when the tooltip component 451 is displayed by performing a touch operation on the button component 402, an execute button may be provided on the tooltip component 451. Subsequently, a process is selected, and then the selected process may be executed by performing a touch operation on this execute button. Also, in the first and second embodiments, there may be provided, on a tooltip component, a cancel button for cancelling display of the tooltip component when the user does not want to execute any of processes assigned to a button component. On a tooltip component, both an execute button and a cancel button may be displayed, or alternatively, either of them may be displayed.

In the first to fourth embodiments, in a state in which a tooltip component has been displayed by the user operating a GUI component, another process may be executed. For example, while a tooltip component is being displayed, when a GUI component serving as a starting point for displaying the tooltip component is operated, another process assigned to the GUI component serving as the starting point may be executed. An example will be described with reference to FIGS. 2A and 2B. The character string "software downloading" 252 is displayed on the tooltip component 251 by performing a tap operation on the button component 203. As described above, such a character string represents a function assigned to a button component. At this time, when a tap operation on the button component 203 is performed once again, details of a process other than a process of displaying the tooltip component 251 assigned to the button component 203, that is, a software downloading function may be executed.

Also, when a character string displayed on a GUI component or a displayed tooltip component itself is operated, another process assigned to the GUI component serving as a starting point for displaying the tooltip component may be executed. An example will be described with reference to FIGS. 2A and 2B. The character string "software downloading" 252 is displayed on the tooltip component 251 by performing a tap operation on the button component 203. At this time, when a tap operation on the character string "software down . . . " 206 or the tooltip component 251 is performed, a software downloading function may be executed. Also, when another GUI component is operated, another process assigned to a GUI component serving as a starting point for displaying a tooltip component may be executed. An example will be described with reference to FIGS. 2A and 2B. As another GUI component, for example, a tooltip component on which "execution of function" is displayed, which is not illustrated, may be newly provided on the screen display area 201. While the character string "software downloading" 252 is being displayed, when the new GUI component is operated, a function for actually downloading software may be executed. In this case, the new GUI component may be displayed only while a tooltip component is being displayed, or alternatively, may be displayed regardless of whether or not the tooltip component has been displayed.

In the above embodiments, control is performed so that a display location of a tooltip component is a location at which a subsequent operation has been taken into account, thereby enhancing user operability. For example, a tooltip component is displayed at a location at which a GUI component serving as a starting point for displaying the tooltip component is not concealed, thereby facilitating user operation of the GUI component serving as the starting point. Furthermore, a tooltip component is displayed in such a manner as to be adjacent to a GUI component serving as a starting point for displaying the tooltip component so that the relationship between the tooltip component and the GUI component is seen, thereby facilitating user operation. Assuming that an operation is performed with a finger, a tooltip component may be displayed above a point at which an operation is performed; alternatively, an area for displaying a tooltip component may be provided on a GUI and the tooltip component may be displayed on the area at all times.

In the first to fourth embodiments, as long as a description of a function displayed on a tooltip component is a more detailed description than that in the case where a tooltip component is not displayed, the description of the function does not have to be fully displayed.

In the third embodiment, one area to which a process of displaying a function is assigned is provided in each button component; alternatively, two or more areas to which a process of displaying a function is assigned may be provided in each button component.

In the above embodiments, a function to be executed via a GUI screen may be a function to be executed by the host PC 101, or alternatively, may be a function to be executed by an external device connected to the host PC 101 via a network or the like. In the case where a function to be executed via a GUI screen is a function to be executed by an external device other than the host PC 101, the host PC 101 instructs the external device to execute a process.

The above embodiments enable selection of an intended function without reducing visibility in a display device having a compact display in which an area for displaying a character string is narrow.

In the above description, processing is implemented by an application; however, similar processing may be implemented by the OS, or alternatively, may be implemented by the OS and the application running together.

In accordance with a display state of an accepting unit displayed on a display unit and an input operation, it is determined whether or not detailed information set in the accepting unit is to be displayed, thereby enabling a process appropriate to a user's intention to be executed with a simple operation.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2013-096554, filed May 1, 2013, which is hereby incorporated by reference herein in its entirety.

What is claimed is:

1. An apparatus comprising:
an obtaining unit configured to obtain a notification based on a touch operation of a user performed on an accepting item displayed on a display unit;
a determination unit configured to determine a display state of a character string set in the accepting item; and
a display control unit configured to control a display on the display unit in accordance with a determination result provided by the determination unit,
wherein, if the entire character string has been displayed, a process set in the accepting item is performed for executing a function in accordance with the touch operation, and if the character string has been displayed with a part of the character string omitted, the display control unit displays, on the display unit, the entire character string in accordance with the touch operation,
wherein the process for executing the function is different from a process for displaying the entire character string,
wherein the touch operation is performed on the accepting item, wherein the display control unit has a function to display the character string in any of a state that the character string is displayed with a part of the character string omitted, and a state that the entire character string is displayed, and wherein the obtaining unit, the determination unit, and the display control unit are implemented by at least one processor.

2. The apparatus according to claim 1, wherein the display unit is a touch panel.

3. The apparatus according to claim 1, wherein the display control unit displays, on the display unit, the entire character string set in the accepting item by displaying a tooltip component on a display area of the display unit.

4. The apparatus according to claim 3, wherein the tooltip component includes an execute button in order to perform the process for executing a function set in the accepting item.

5. The apparatus according to claim 1, wherein the process of displaying the entire character string and the process of executing a function are set in the accepting item.

6. The apparatus according to claim 5, wherein the character string describes information on the process for executing a function set in the accepting item.

7. The apparatus according to claim 5, wherein, if the number of times the touch operation has been performed on the accepting item in which a display state of the accepting item is a state in which a part of the character string set in the accepting item has not been displayed is a predetermined number of times, the entire character string set in the accepting item is to be displayed on the display unit.

8. The apparatus according to claim 1, wherein the determination unit determines whether the entire character string is displayed on the display unit.

9. The apparatus according to claim 1, wherein, if the obtaining unit obtains information based on a touch operation performed on the accepting item in a display state that a part of the character string set in the accepting item has been omitted, the entire character string is to be displayed on the display unit, and if the obtaining unit obtains information based on a touch operation performed on the accepting item in a display state that the entire character string set in the accepting item has been displayed, the process set in the accepting item for executing the function is to be performed.

10. The apparatus according to claim 1, wherein, if a touch operation is a touch operation performed on the accepting item in which a display state of the accepting item is a state in which a character string, in which a part of the character string set in the accepting item has been omitted, has been displayed, the entire character string set in the accepting item is to be displayed on the display unit.

11. A method performed by at least one processor, the method comprising:

obtaining notification based on a touch operation of a user performed on an accepting item displayed on a display unit;

determining a display state of a character string set in the accepting item; and controlling a display on the display unit in accordance with a determination result provided in the determining, wherein, if the entire character string has been displayed, a process set in the accepting item is performed for executing a function in accordance with the touch operation, and if the character string has been displayed with a part of the character string omitted, the display is controlled to display, on the display unit, the entire character string in accordance with the touch operation, wherein the process for executing the function is different from a process for displaying the entire character string, wherein the touch operation is performed on the accepting item, and wherein the display is controlled to have a function to display the character string in any of a state that the character string is displayed with a part of the character string omitted, and a state that the entire character string is displayed.

12. The method according to claim 11, wherein the display unit is a touch panel.

13. The method according to claim 11, wherein the display unit is controlled to display the entire character string set in the accepting item by displaying a tooltip component on a display area of the display unit.

14. The method according to claim 13, wherein the tooltip component includes an execute button in order to perform the process for executing a function set in the accepting item.

15. The method according to claim 11, wherein the process of displaying the entire character string and the process of executing a function are set in the accepting item.

16. The method according to claim 15, wherein the character string describes information on the process for executing a function set in the accepting item.

17. The method according to claim 15, wherein, if the number of times the touch operation has been performed on the accepting item in which a display state of the accepting item is a state in which a part of the character string set in the accepting item has not been displayed is a predetermined number of times, the entire character string set in the accepting item is to be displayed on the display unit.

18. The method according to claim 11, wherein the determining determines whether the entire character string is displayed on the display unit.

19. The method according to claim 11, wherein, if the obtaining obtains information based on a touch operation performed on the accepting item in a display state that a part of the character string set in the accepting item has been omitted, the entire character string is to be displayed on the display unit, and if the obtaining obtains information based on a touch operation performed on the accepting item in a display state that the entire character string set in the accepting item has been displayed, the process set in the accepting item for executing the function is to be performed.

20. The method according to claim 11, wherein, if a touch operation is a touch operation performed on the accepting item in which a display state of the accepting item is a state in which a character string, in which a part of the character string set in the accepting item has been omitted, has been displayed, the entire character string set in the accepting item is to be displayed on the display unit.

21. The method according to claim 11, wherein the function is a downloading function for downloading software.

22. The method according to claim 11, wherein the function is a downloading function for downloading an instruction manual.

23. The method according to claim 11, wherein the function is any of a printing function, a scanning function and a fax function.

24. A non-transitory computer readable storage medium storing a program for causing a computer to execute a method comprising:
   obtaining notification based on a touch operation of a user performed on an accepting item displayed on a display unit;
   determining a display state of a character string set in the accepting item; and
   controlling a display displayed on the display unit in accordance with a determination result provided in the determining,
   wherein, if the entire character string has been displayed, a process set in the accepting item is performed for executing a function in accordance with the touch operation, and if the character string has been displayed with a part of the character string omitted, the display is controlled to display, on the display unit, the entire character string in accordance with the touch operation,
   wherein the process for executing the function is different from a process for displaying the entire character string,
   wherein the touch operation is performed on the accepting item, and
   wherein the display is controlled to have a function to display the character string in any of a state that the character string is displayed with a part of the character string omitted, and a state that the entire character string is displayed.

25. An apparatus comprising:
   an obtaining unit configured to obtain notification based on a touch operation of a user performed on an accepting item displayed on a display unit;
   a determination unit configured to determine a display state of a character string set in the accepting item; and
   a display control unit configured to control a display on the display unit in accordance with a determination result provided by the determination unit,
   wherein, if the entire character string has been displayed, a process set in the accepting item is performed for executing a function in accordance with the touch operation, and if the character string has been displayed with a part of the character string omitted, the display control unit displays, on the display unit, the entire character string in accordance with the touch operation,
   wherein the touch operation is performed on the accepting item,
   wherein the display control unit has a function to display the character string in any of a state that the character string is displayed with a part of the character string omitted, and a state that the entire character string is displayed, and
   wherein the obtaining unit, the determination unit, and the display control unit are implemented by at least one processor.

26. The apparatus according to claim 25,
   wherein, if a touch area of a touch operation in the accepting item is an area in which the process of displaying the entire character string set in the accepting item, the determination unit determines that the entire character string set in the accepting item is to be displayed on the display unit.

27. The apparatus according to claim 25,
   wherein, if a touch area of a touch operation in the accepting item is an area in which the process of executing the function is set, the determination unit determines that the function set in the accepting item is to be executed.

28. A method performed by at least one processor, the method comprising:
   obtaining notification based on a touch operation of a user performed on an accepting item displayed on a display unit;
   determining a display state of a character string set in the accepting item; and
   controlling a display on the display unit in accordance with a determination result provided in the determining,
   wherein, if the entire character string has been displayed, a process set in the accepting item is performed for executing a function in accordance with the touch operation, and if the character string has been displayed with a part of the character string omitted, the display is controlled to display, on the display unit, the entire character string in accordance with the touch operation,
   wherein the touch operation is performed on the accepting item, and
   wherein the display is controlled to have a function to display the character string in any of a state that the character string is displayed with a part of the character string omitted, and a state that the entire character string is displayed.

* * * * *